United States Patent [19]
Arizumi et al.

[11] Patent Number: 5,151,932
[45] Date of Patent: Sep. 29, 1992

[54] METHOD AND SYSTEM FOR SELECTIVELY COMMUNICATING WITH A TELEPHONE OR A NON-TELEPHONE TERMINAL THROUGH A PUBLIC TELEPHONE NETWORK

[75] Inventors: Masato Arizumi; Norio Ozawa; Yasuo Haruta; Yoshinobu Mabuchi, all of Tokyo, Japan

[73] Assignee: Oki Electric Industry Co., Ltd., Tokyo, Japan

[21] Appl. No.: 694,979

[22] Filed: May 6, 1991

Related U.S. Application Data

[63] Continuation-in-part of Ser. No. 382,066, Jul. 14, 1989, abandoned.

[30] Foreign Application Priority Data

Nov. 17, 1987 [JP] Japan .................................. 62-290084
Nov. 17, 1987 [JP] Japan .................................. 62-290085

[51] Int. Cl.$^5$ .......................................... H04M 11/00
[52] U.S. Cl. ............................... 379/106; 379/107
[58] Field of Search ............... 379/94, 102, 104-107, 379/93

[56] References Cited

U.S. PATENT DOCUMENTS

| | | | |
|---|---|---|---|
| 4,455,453 | 6/1984 | Parasekvakos et al. | 379/107 |
| 4,578,534 | 3/1986 | Shelley | 379/107 |
| 4,833,618 | 5/1989 | Verma et al. | 379/107 |
| 4,850,010 | 7/1989 | Stanbury et al. | 379/107 |
| 4,864,603 | 9/1989 | Battmann et al. | 379/106 |

FOREIGN PATENT DOCUMENTS

2099260 12/1982 United Kingdom ................ 379/107

*Primary Examiner*—James L. Dwyer
*Assistant Examiner*—Wing F. Chan
*Attorney, Agent, or Firm*—Spencer, Frank & Schneider

[57] ABSTRACT

A system for communicating through a public telephone network includes a terminal side adapter which connects either a telephone set or a non-telephone terminal (such as a gas meter terminal) to the telephone network. Communication with the non-telephone is normally scheduled during the early morning hours to minimize conflict with normal telephone usage. Communication with the non-telephone terminal is initiated from a data center. A center side adapter unit makes a predetermined sequence of calls during predetermined time zones, and each of these calls is quickly interrupted without being answered at the terminal side. However the sequence of interrupted calls signals the terminal side adapter unit to telephone the data center and to connect the non-telephone terminal to the telephone network. If the terminal side adapter unit receives an incoming call outside the time zones, or if a call received within a time zone is not quickly interrupted, the incoming call is routed to the telephone set.

21 Claims, 6 Drawing Sheets

METHOD AND SYSTEM FOR SELECTIVELY COMMUNICATING WITH A TELEPHONE OR A NON-TELEPHONE TERMINAL THROUGH A PUBLIC TELEPHONE NETWORK

CROSS-REFERENCE TO RELATED APPLICATION

This is a continuation-in-part of application, Ser. No. 07/382,066, filed Jul. 14, 1989 abandoned.

BACKGROUND OF THE INVENTION

1. Field of the Invention

The present invention relates to a communication system for communication between a plurality of non-telephone terminals each connected to a public telephone network, and a control center for controlling those non-telephone terminals.

2. Description of the Prior Art

A system of this type is constructed such that a telephone set and a non-telephone terminal such as a gas meter terminal, both provided in a house, are connected to the same telephone line through a terminal adapter unit, the switching of the connection therebetween being performed by the terminal adapter unit. The gas meter terminal, a labor-saving device which provides automated meter reading, transmits information through a public telephone network to a gas control center (hereinafter referred to as a control center). The transmitted information includes any data issued from the gas meter terminal, preset data stored in the same terminal and any alarm information issued from the gas meter terminal immediately after the detection of a gas leak. For this, the terminal adapter unit is operative with a communication system of the type where any signal is sent only from the terminal side.

Automated gas metering, however, requires some associated operations: In addition to the data transfer from the gas meter terminal to the control center as mentioned above, the gas meter terminal should be checked if any abnormal value is found in collected data. On/off control of a gas valve is desirable when the user is away from his house over a long time. Other desirable operations include checking on the conditions of gas usage at all times, resetting of the gas counter to zero, informing the user if there is a change in the telephone number of the control center, correction of the time indicated on a clock included in the terminal adapter, etc. To satisfy these requirements, two situations can be considered: In one situation, the terminal may be required by the control center to transfer additional data concerning those requirements by making use of a channel established therebetween when the terminal transmits ordinary data to the control center, and in the other situation, the terminal needs instruction from the control center. However, since in the conventional system described above the terminal adapter unit adopts the previously mentioned communication system, of the type where the terminal establishes a call, the control center cannot transmit such a signal concerning those requirements. That is, the convention system must rely upon some other informing means such as those mediating a telephone or a person engaged with that work and the like.

There is another known system, called the control center sending system, by which the control center can send such a signal at any time. Such a system is disclosed by NTT as "An Interface for No-Ringing," Communication Services (Proposal), Nippon Telegraphy and Telephony K.K., May 26, 1962. In this system, a local switch has the function of sending a terminal identifying signal. Once the control center calls an associated terminal, the local switch sends a call signal of a specific frequency to a terminal adapter. The terminal adapter identifies the call signal as designating the terminal, and connects the telephone line to the terminal.

SUMMARY OF THE INVENTION

It is an object of the present invention to provide an excellent communication system which employs a public telephone network and which is capable of selectively connecting to the network a telephone set or a non-telephone terminal at a residence, without the need for expensive equipment.

A communication system according to one aspect of the invention includes a telephone network for switching a plurality of telephone lines; a telephone accessible to the telephone network; a non-telephone terminal for performing data communication via the telephone network; first control means, connected to a first telephone line the plurality of telephone lines, for controlling the connection of the telephone and the non-telephone terminal to the telephone network, the first control means including timer means for monitoring predetermined time zones and for measuring predetermined first and second predetermined time periods; center apparatus means for supervising data communication with the non-telephone terminal; and second control means, connected to a second telephone line of the plurality of telephone lines, for controlling the connection of the center apparatus means to the telephone network, the second control means including means for initiating a predetermined sequence of calls to the first control means via the telephone network in response to the center apparatus means, and means for interrupting each call after receiving a respective ring back signal from the telephone network to restore the lines, wherein the first control means additionally includes means for determining whether a ringing signal for a call is received within a time zone and interrupted within the first time period, means for determining whether a call is received in the predetermined sequence, and means for calling the second control means if the first control means receives a plurality of calls in the predetermined sequence and each of the plurality of calls in the predetermined sequence was received during a respective time zone and interrupted within the first time period, and wherein the first control means additionally includes means for connecting the first telephone line to the non-telephone terminal if the first control means receives an answer signal from the second control means in response to the call from the first control means within the second time period.

The second control unit is associated with the center apparatus and responds to a signal from the center apparatus by sending a call through the public telephone network using the telephone number of the residence or office (etc.) having the telephone and the non-telephone terminal. Time zones for receiving calls from the second control unit have been previously set in the first control unit at the residence or office. If the first control unit receives a predetermined sequence of calls during the time zones and these calls are quickly interrupted, without the first control unit having answered, the first control unit then telephones the second control unit and connects the non-telephone terminal, to the telephone lines so that the non-telephone terminal can communicate with the center apparatus. As a result, the center apparatus can poll the non-telephone terminal but charges for using the telephone network do not accrue until the first control unit telephones the second control unit. If an incoming call to the residence or office does not occur within one of the time zones or, if it does occur during one of the time zones, but is not quickly interrupted, the incoming call is assumed to be from an ordinary telephone and so the telephone at the residence or office is connected to the network. Outgoing calls can be made from the telephone at the office or residence at almost any time except when the non-telephone terminal is communicating. Moreover the non-telephone terminal can communicate with the center apparatus whenever an anomalous situation such as an emergency arises.

In accordance with another aspect of the invention, an adapter unit for selectively connecting a telephone or a non-telephone terminal to a network includes: means for receiving a ringing signal for a call sent via the telephone network; means for determining whether the ringing signal was received within one of a plurality of predetermined time zones; means for determining whether the ringing signal was interrupted within a predetermined first time period; means for determining whether the call was received in a predetermined sequence; means for calling the center apparatus if the ringing signal was received within a time zone, the ringing signal was interrupted within the first time period, and the call was the last call received in the sequence; and means for connecting the telephone network to the non-telephone terminal if the adapter unit receives an answer signal from the center apparatus in response to the call to the center apparatus within a predetermined second time period.

In accordance with yet another aspect of the invention, a method for connecting a non-telephone terminal to a telephone network to permit data communication with a data center, or for connecting a telephone to a network, using an adapter unit that is connected to both the non-telephone terminal and the telephone, includes the steps of: receiving a ringing signal for a call sent via the telephone network; determining whether the ringing signal was received within one of a plurality of time zones; determining whether the ringing signal was interrupted within a predetermined first time period; determining whether the call was received in a predetermined sequence; calling the center apparatus if the ringing signal was received within a time zone, the ringing signal was interrupted within the first time period, and the call was the last call received in the sequence; and connecting the telephone network to the non-telephone terminal if the adapter unit receives an answer signal from the center apparatus in response in response to the call to the center apparatus within a predetermined second time period. The method can also be practiced by including the steps of: receiving at the adapter unit a first ringing signal for a call sent via the network; connecting the telephone to the network if the first ringing signal is not received during a first predetermined time zone; connecting the telephone to the network if the first ringing signal was received during the first time zone but was not interrupted within a predetermined time period; receiving at the adapter unit a second ringing signal for another call sent via the network; connecting the telephone to the network if the second ringing signal was not received within a second predetermined time zone; connecting the telephone to the network if the second ringing signal was received during the second time zone but was not interrupted within the predetermined time period; telephoning the data center apparatus if the first ringing signal was received during the first time zone, the second ringing signal was received during the second time zone, and both ringing signal were interrupted within the predetermined time period.

BRIEF DESCRIPTION OF THE DRAWINGS

FIGS. 4 (*a*) through 4 (*g*) are timing diagrams which are used for explaining how the center side adapter unit initiates communication with the terminal side adapter unit;

DESCRIPTION OF THE PREFERRED EMBODIMENT

In what follows, an embodiment of the present invention will be described with reference to the accompanying drawings.

Figure 1:
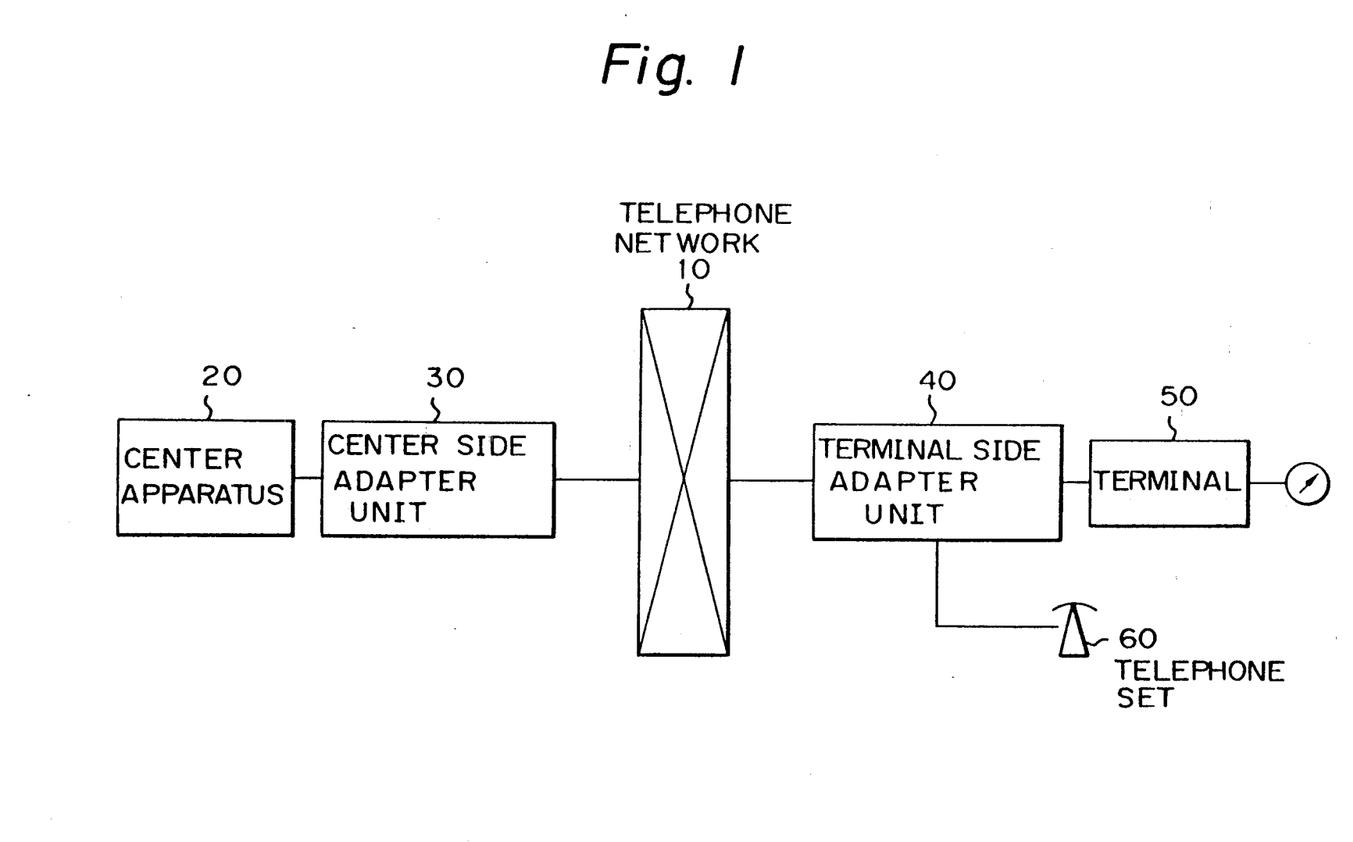
FIG. 1 is a block diagram illustrating an embodiment of a system in accordance with the present invention.

FIG. 1 illustrates a system, to which the present invention is applied, in the form of a circuit block diagram. In the Figure, reference number 10 designates a public telephone network (hereinafter, referred to as a telephone network), reference number 20 designates a center apparatus disposed in a gas control center, and reference number 30 designates a center side adapter unit, through which the center apparatus 20 is connected to the telephone network 10.

Reference number 50 represents a non-telephone terminal such as gas meter terminal (hereinafter, referred to as a terminal), to which a gas meter and sensors, etc., are connected. Reference number 60 identifies a telephone set, which is connected together with the terminal 50 to the telephone network 10 via a terminal side adapter unit 40.

Figure 2:
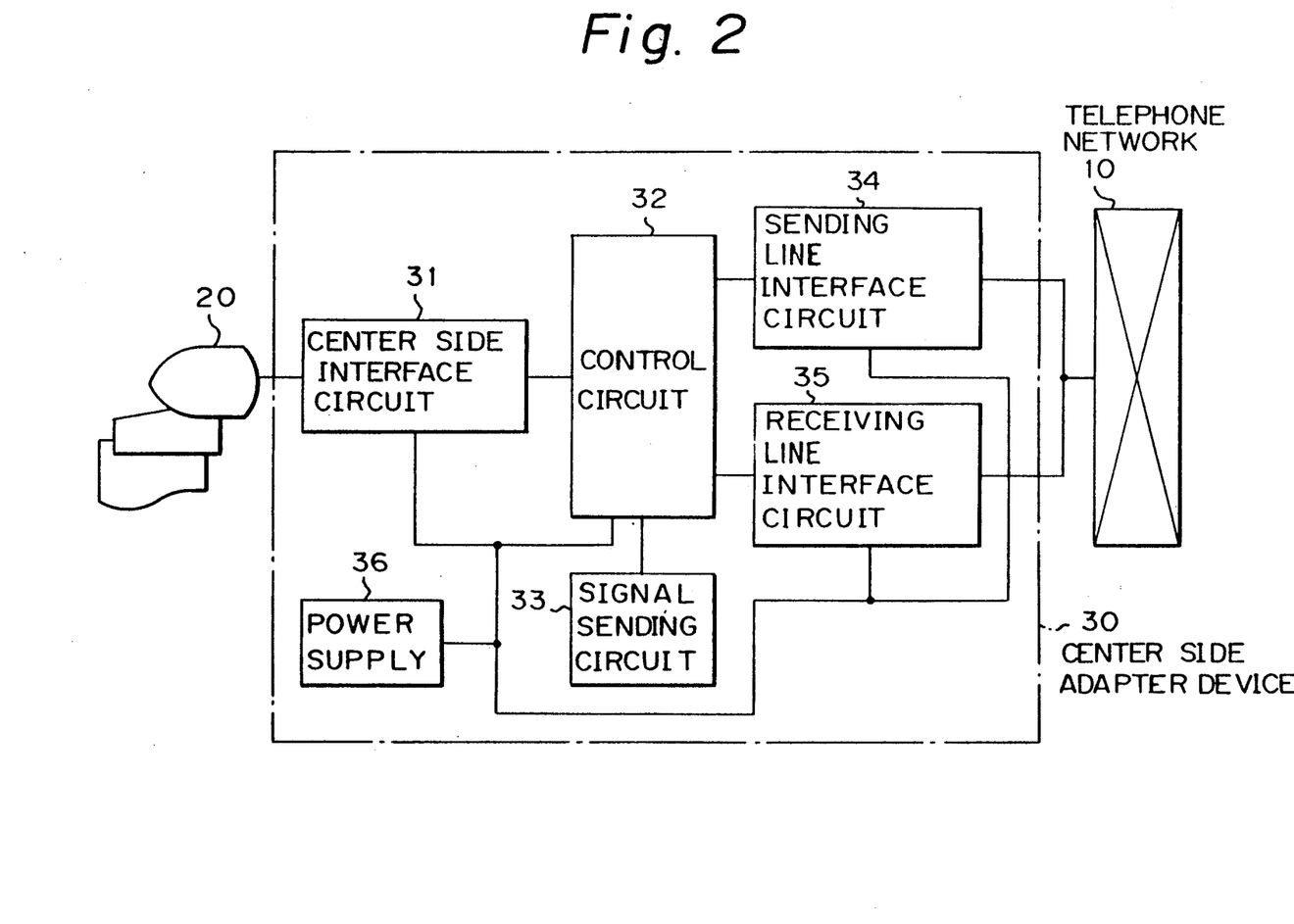
FIG. 2 is a block diagram illustrating the configuration of the center side adapter unit shown in FIG. 1.

Referring next to FIG. 2, the configuration of the center side adapter unit 30 is illustrated in the form of a circuit block diagram. The adapter unit 30 includes a center side interface circuit 31 for interfacing with the center apparatus 20, a control circuit 32 for controlling the operation of sending and receiving signals between the center apparatus 20 and the terminal 50, and a signal sending circuit 33 for sending a dial signal corresponding to a terminal telephone number to the control circuit 32. The adapter unit 30 also includes a sending central office line interface circuit 34, a receiving central office line interface circuit 35, and a power supply 36 for supplying power to the respective constituent circuits, such as a commercial 100 volt AC power supply.

The operation of the center side adapter unit 30 will now be described.

First, when the center apparatus 20 requires for the terminal 50 to call it, a requirement signal from center apparatus 20 is inputted into the control circuit 32 via the interface circuit 31. The control circuit 32 reads out a dial signal corresponding to the associated telephone number from the signal sending circuit 33, and a call is established via the central office interface circuit 34. Here, if the called partner telephone set (i.e., telephone set 60) is busy and the control circuit 32 identifies a busy tone through the receiving interface circuit 35, the control circuit 32 temporarily interrupts the calling procedure and repeats it after the lapse of a predetermined time. If the control circuit 32 does not receive a busy tone, it monitors the ring back signal sent from the public telephone network 10 during the call and interrupts the call immediately after receiving the ring back signal. The control circuit 32 originates calls repeatedly for a predetermined number of times in a predetermined sequence, as will be discussed below. This signals the terminal side adapter unit 40 to call the center side adapter unit 30. Thereafter, the control circuit 32 connects the center apparatus 20 to the telephone line. After completing the line connection with the terminal side adapter unit 40, center side adapter unit 30 sends out a center identification signal CS to the terminal side adapter unit 40 and awaits an answer signal TS from the terminal side adapter unit 40. After receiving the answer signal TS, center side adapter unit 30 allows center apparatus 20 to transmit any data it may have for terminal 50 and then allows center apparatus 20 to receive data from terminal 50.

Figure 3:
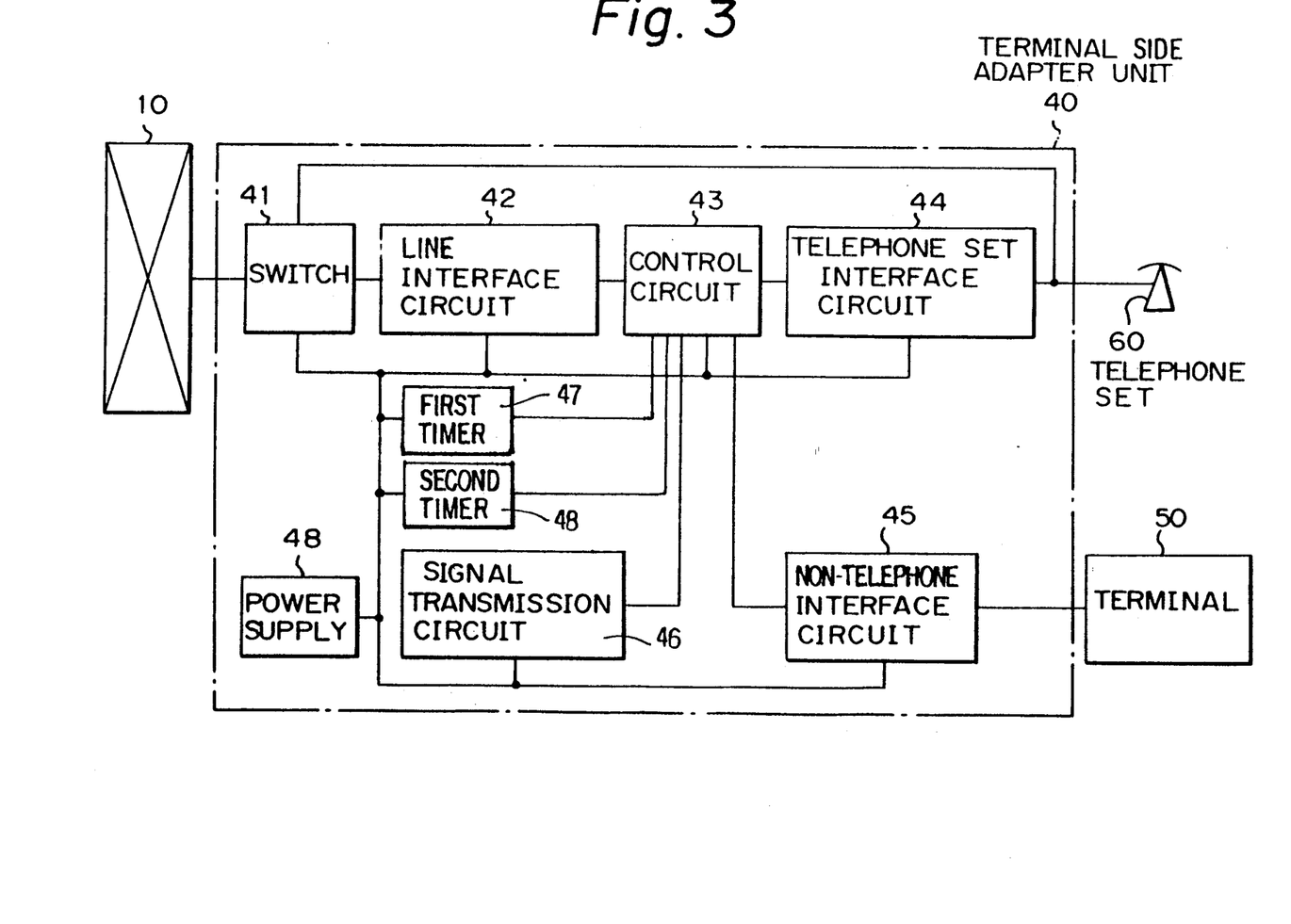
FIG. 3 is a block diagram illustrating the configuration of the terminal side adapter unit shown in FIG. 1.
Figure 4:
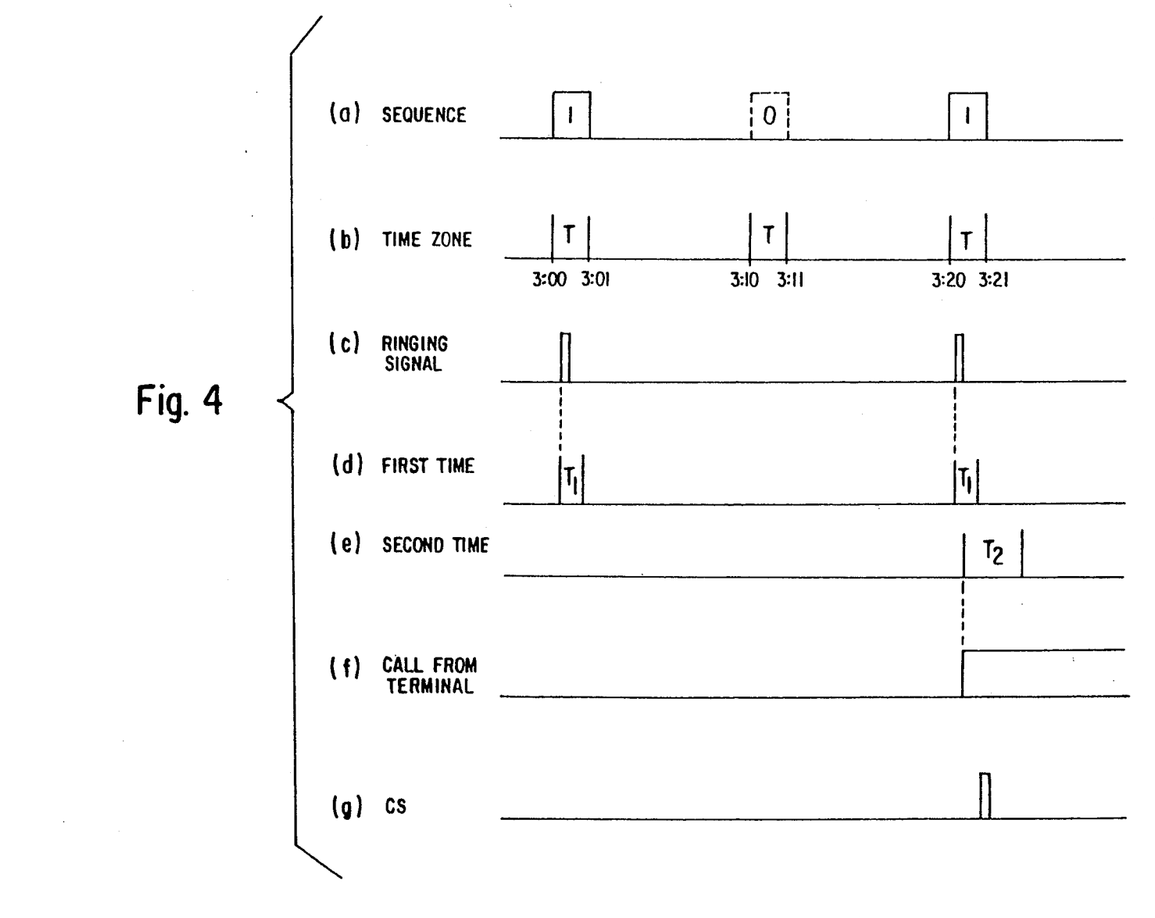

FIG. 3 is a block diagram illustrating the configuration of the terminal side adapter unit 40, and FIG. 4 is a timing chart providing an example in which data communication has been effected between the center apparatus 20 and the terminal 50.

As illustrated in FIG. 3, the adapter unit 40 includes a switch 41 for switching, upon interruption of service and the like, the telephone network 10 and the telephone set 60 to directly connect them. Adapter unit 40 also includes a central office line interface circuit 42 for call detection and a control circuit 43 for controlling the switching of the connections among the terminal 50, the telephone set 60, and the telephone network 10 and for controlling the transmission and reception of the associated signals. Adapter unit 40 further includes a telephone set interface circuit 44 for interfacing the telephone set 60 with the control circuit 43, a non-telephone terminal interface circuit 45 for detecting the associated signal sent from the terminal 50, controlling the transmission procedure, and supplying power to the terminal 50, a signal transmission circuit 46 for outputting the dial number of the center telephone number to the control circuit 43, a first timer 47 for indicating the present time, a second timer 48 for monitoring predetermined time periods, and a power supply 49 for supplying power to the respective constituent circuits. Power supply 49 may be a commercial 100 volt AC power supply, for example.

The central office interface circuit 42 is connected to the telephone network 10 via the switch 41 and a common line (office line) 15 for the telephone set 60 and the terminal 50. Circuit 42 monitors the line 15 to detect an incoming call, etc. The control circuit 43 controls incoming and outgoing calls, monitors for collision of call attempts, and controls the switching of the line 15. As will be discussed, control circuit 43 may cause incoming calls to be routed either through telephone set interface circuit 44 to telephone set 60 or through non-telephone terminal interface circuit to terminal 50. Telephone set interface circuit 44 also monitors telephone set 60 and signals control circuit 43 to connect telephone set 60 to line 15 when telephone set 60 is used to originate an outgoing call. Similarly, non-telephone terminal interface circuit 45 monitors terminal 50 and signals control circuit 43 to connect terminal 50 to line 15 if terminal 50 detects an emergency. Furthermore non-telephone terminal interface circuit 45 controls the data transmission procedure to and from the terminal 50. The first timer 47 informs the control circuit 43 of the present time. The second timer 48 sets a first time period (FIG. 4d) to monitor the time interval from the reception of a call to the interruption of the call and a second time period (FIG. 4e) to monitor the time interval from the origination of a call to the reception of an answer to the call.

Predetermined time zones T (FIG. 4b) are set beforehand in control circuit 43. Here, the time zones T are from 3 a.m. to 3:01 a.m., from 3:10 a.m. to 3:11 a.m., and from 3:20 a.m. to 3:21 a.m., that is, for 1 minute every 10 minutes during a half hour in the early morning. If control circuit 43 receives a ringing signal for an incoming call (FIG. 4c) during a time zone T (confirmed with the use of first timer 47), it then actuates the second timer 48 to start measuring a first time period $T_1$ (FIG. 4d). Although the control circuit 43 confirms the reception of the call by detecting the ringing signal, it may instead confirm it by detecting an inversion of the line voltage. If the call is interrupted within the first time period $T_1$ (confirmed with the use of the second timer 48), the control circuit 43 checks whether the call is received in a predetermined sequence (FIG. 4a). The sequence is expressed by combination of 1's and 0's (yes or no) indicating whether calls have been received within the time zones T. The sequence "1 0 1," for example, indicates that calls have been received within the first and third of the three successive time zones T shown.

If the calls have been received by terminal side adapter unit 40 in the predetermined sequence during the time zones T, the control circuit 43 originates a call (FIG. 4f) to the center apparatus 20 and actuates the second timer 48 again to start measuring a second time period $T_2$ (FIG. 4e). If the control circuit 43 receives the center identification signal CS (FIG. 4g) within the second time period $T_2$ (confirmed with the use of the second timer 48), it sends out the answer signal TS to the center side adapter unit 30 and thereafter connects the terminal 50 with the line 15.

On the other hand, if the terminal side adapter unit 40 receives a call outside a time zone T, then the control circuit 43 instead connects the telephone set 60 with the line 15. In addition, if the terminal side adapter unit 40 receives a call from an ordinary telephone set within a time zone T and the call is not interrupted within the first time period $T_1$, the control circuit 43 also connects the telephone set 60 with the line 15.

It should be noted here that, in any communication between the center apparatus 20 and the terminal side adapter unit 40, the center apparatus 20 can correct the current time by resetting the first timer 47, can change the time zones T, can change the first and second time periods $T_1$ and $T_2$, and can change the call sequence. If there is no correction or change, the present data remains usable as it is.

Figure 5:
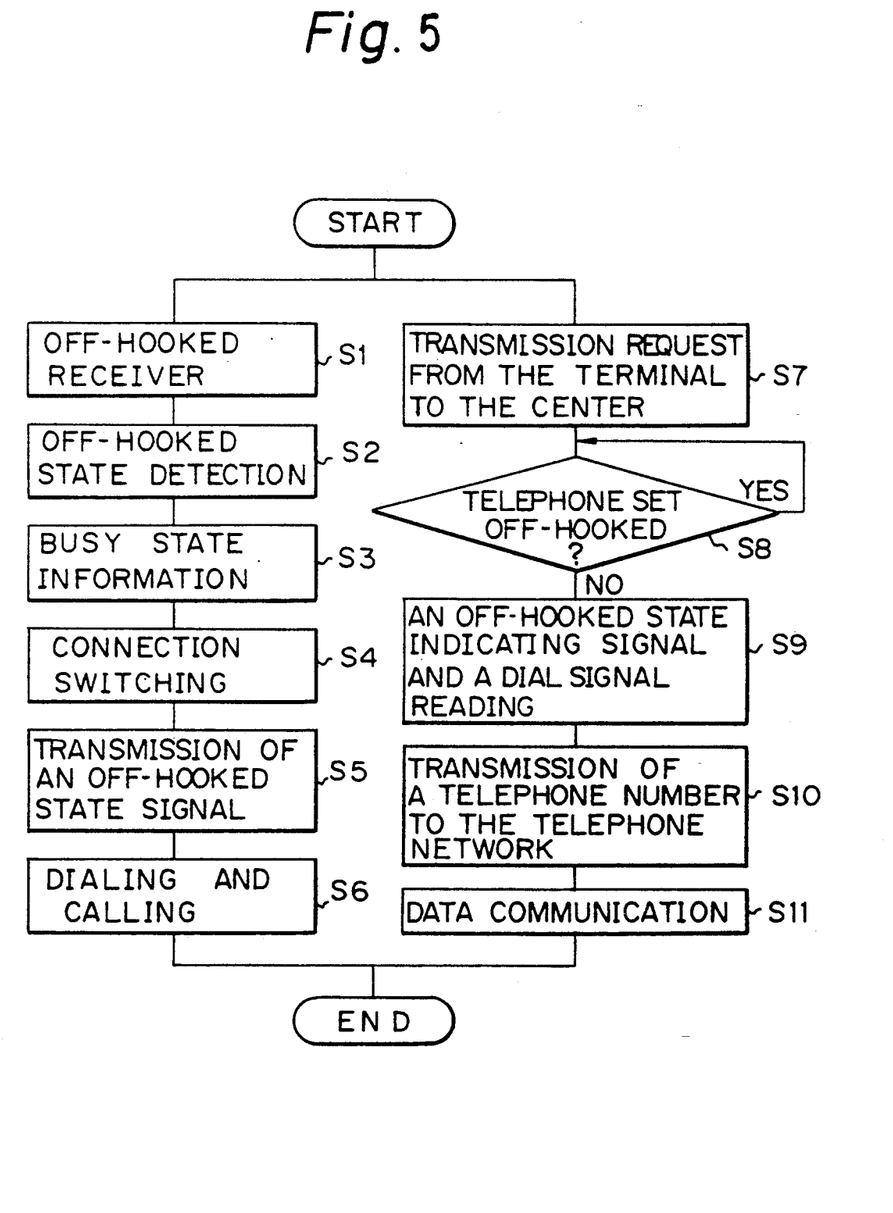
FIG. 5 is a flow chart illustrating the operation of the terminal side adapter unit of FIG. 1 when a regular telephone call or non-telephone data communication is initiated from the terminal side.

Operation of the adapter unit 40 when a call originates from the terminal side with the arrangement described above will now be described with reference to the flow chart illustrated in FIG. 5.

First, operation during an ordinary call originating from the terminal side will be described. When an ordinary call is made using the telephone set 60, the receiver of the telephone set 60 is taken off-hook (S1), and the telephone set interface circuit 44 detects it (S2) and informs the control circuit 43 of the telephone set being busy (S3). The control circuit 43 connects the telephone set 60 with the telephone network 10 (S4) and transmits to the telephone network 10 an off-hook signal indicative of the telephone set 60 having been taken off-hood through the central office interface circuit 42 and the switch 41 (S5). This allows an ordinary call to be originated and any service to be effected thereafter (S6). Additionally, the terminal 50 may generate a request to send an un-scheduled message to the center apparatus 20 without waiting to be polled by the center apparatus. This might occur, for example, if a sensor (not illustrated) connected to the terminal 50 detects an emergency condition. A request to send a message from the terminal 50 to the center apparatus 20 is inputted into the control circuit 43 through the terminal interface circuit 45 (S7). The control circuit 43, after receiving the request, judges whether or not the telephone set 60 is off-hook (S8). If not, the control circuit 43 transmits to the telephone network 10 an off-hook signal, reads the dial signal of the associated center telephone number from the signal sending circuit 46 (S9), and transmits the telephone number to the telephone network 10 through the central office interface circuit 42 and the switch 41 (S10), allowing data communication to be effected between the center apparatus 20 and the terminal 50 (S11).

Figure 6:
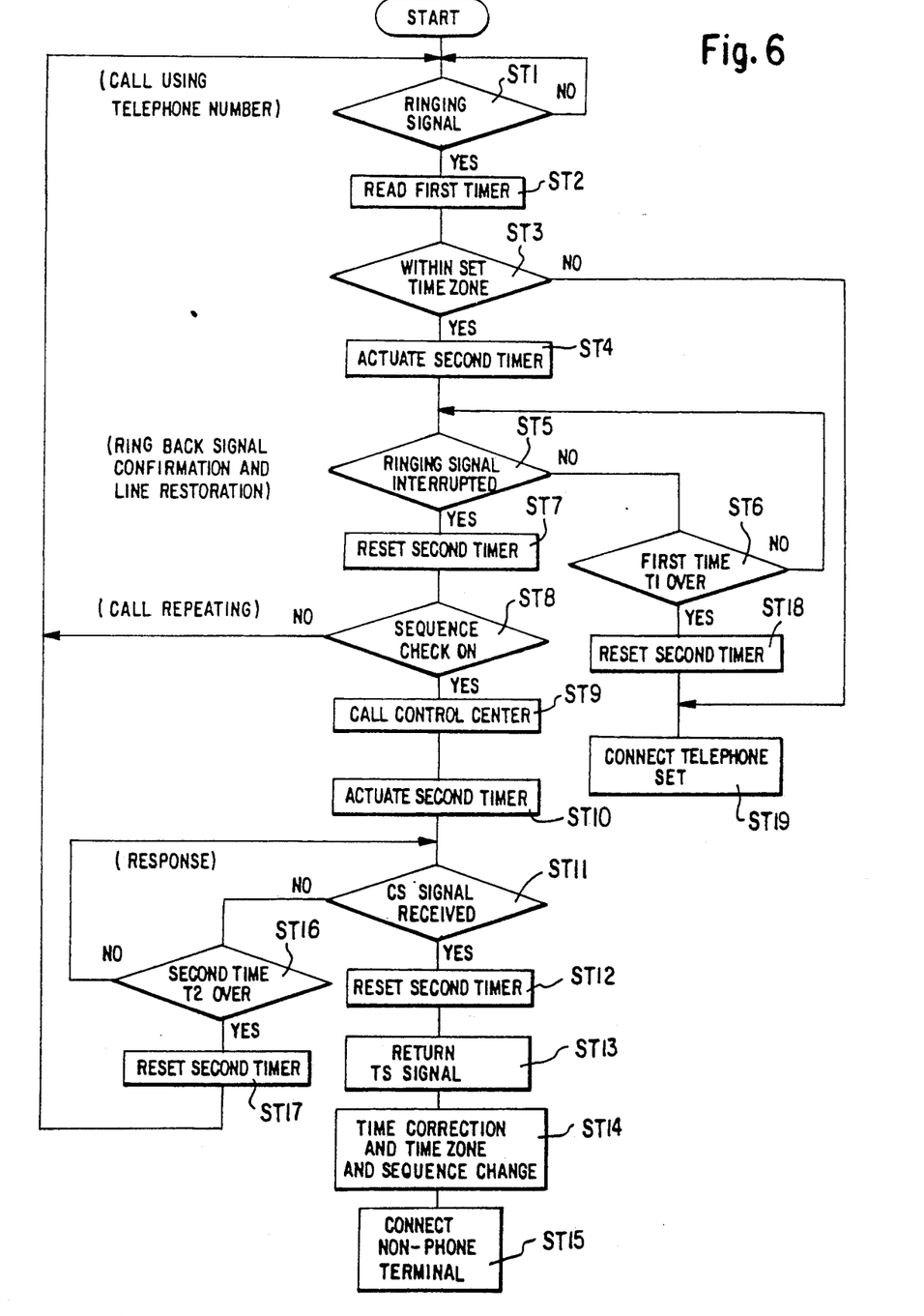
FIG. 6 is a flow chart illustrating the procedure for connecting either the telephone or the non-telephone terminal at the terminal side to the network in response to incoming calls.

Operation of adapter unit 40 when a call originates from the center side will now be described with reference to the flow chart illustrated in FIG. 6. Operation of the center side adapter unit 30 is shown in parentheses in FIG. 6.

The originating call from the center apparatus 20 is received as a ringing signal by the terminal side adapter unit 40 through the center side adapter unit 30 and the telephone network 10. The ringing signal is inputted into the control circuit 43 through the switch 41 and the central office interface circuit 42 (ST1). The control circuit 43, after receiving the ringing signal, reads the time from the first timer 47 (ST2) and judges whether or not the ringing signal is received within a preset time zone T (ST3). If so, the control circuit 43 actuates the second timer 48 (ST4) in order to measure the period $T_1$. The center side adapter unit 30 monitors the ring back signal sent from the public telephone network 10 during the call and interrupts the call immediately after receiving the ring back signal to restore the line 15. The control circuit 43, after confirming that the ringing signal has been interrupted before the second timer 48 has undergone the first time-out (ST5, ST6), resets the second timer (ST7). The control circuit 43 also checks whether or not the call completed the predetermined sequence (ST8), and if not, the control circuit 43 waits for a new ringing signal (ST1). The control circuit 43 repeats the above-mentioned steps ST1–ST8 whenever it receives a ringing signal from the center side adapter unit 30. The control circuit 43, after determining at step ST8 that a call completes the predetermined sequence, regards the call as one for the terminal 50 and originates a call to the center apparatus 20 using the telephone number read out from signal transmission circuit 46 (ST9). It also actuates the second timer 48 (ST10) in order to measure the period $T_2$. If the control circuit 43 receives the center identification signal (CS) from the adapter unit 30 before the second timer 48 undergoes the second time-out (ST11), it resets the second timer 48 (ST12) and sends out the answer signal TS to the center side adapter unit 30 (ST13). If desired, center apparatus 20 can then transmit data causing control circuit 43 to correct the first timer 47, change the time zones T, change the first or second time periods $T_1$ or $T_2$, and/or change the call sequence (ST14). Then the line 15 is connected to the terminal 50 (ST15) and the associated information is transferred from terminal 50 to the center apparatus 20 in conformity with a set procedure. Since the terminal 50 makes the call without having answered the calls from the center apparatus 20, the center apparatus 20 is not charged for the call.

Additionally, in the step ST11, if the second time-out is reached without the control circuit 43 having received the center identification signal (CS) (ST16), the control circuit 43 resets the second timer 48 (ST17) and waits for a new ringing signal (ST1).

In step ST5, if the first time-out is reached without the ringing signal being interrupted (ST6), the control circuit 43 regards the call as one from an external telephone. The control circuit 43 then resets the second timer 48 (ST18) and connects the line 15 to the telephone set 60 (ST19).

Furthermore, the control circuit 43 recognizes, if it judges in the step ST3 that the ringing signal is being received outside a time zone T, that the ringing signal represents a call originating from another telephone set, and connects the telephone set 60 with the line 15 (ST19).

Although in the above embodiment the time to receive a call from the center apparatus was assumed to lie after 3 a.m., the reason for this selection is that the rate of telephone usage in a home is generally low after midnight. Thus, the time zones need not be limited to the particular ones indicated above.

Furthermore although commercial 100 volt AC power supplies were employed for the center side and terminal side adapter units, batteries or solar batteries may be preferable if the system is installed out of doors.

Additionally, although a terminal side adapter unit and a non-telephone terminal were individually provided in the embodiment described above, they may be united into the same apparatus. Although the non-telephone terminal was described as a gas meter terminal in the foregoing example, the non-telephone terminal may include a terminal for a home security system or a terminal for a facsimile machine and a personal computer, etc.

The time zone duration is preferably fifteen minutes or less. Five or ten minute time zones can be used, as can the one minute time zones shown in FIG. 4b. Furthermore time zones of less than a minute, such as 45 seconds or 30 seconds, are practical for local polling since telephone exchanges generally have considerable excess capacity in the early morning hours and thus can respond quickly to calling requests from the center side adapter unit. Furthermore, although FIG. 4b shows the time zones as being spaced at ten minute intervals, longer intervals of 15 minutes, 30 minutes, 45 minutes, and so forth could be used instead. Intervals shorter than ten minutes (e.g., eight minute intervals or five minute intervals) can be used, and moreover irregular intervals can be employed. The sequence (1 0 1) shown in FIG. 4a is not, of course, the only one that can be used. All that is needed is a sequence which includes at least two calls within the time zones. The sequence "1 1" would, for example, be an acceptable one. Furthermore the terminal side adapter unit can be programmed to respond to a number of sequences. For example the terminal side adapter unit could be programmed to telephone the center side adapter unit if it receives any of the sequences "1 1," "1 0 1," "1 0 0 1," or "1 0 0 0 1." In this way, during the first time zone (which may be of greater duration than the rest) the center side adapter unit could effectively prepare a number terminal side adapter units for polling and each of these terminal side adapter units would respond when it receives a follow-up call from the center side adapter unit during one of the following time zones. Should the center side adapter unit be tied up longer than anticipated during communications with one of the terminal side adapter units, so that such communication continued during a time zone, there would still be sequences available to which the remaining terminal side adapter units could respond.

From the foregoing description it will be apparent that the present invention provides an inexpensive communication system which nevertheless functions excellently. The equipment at the terminal side adapter unit is relatively inexpensive, and only one telephone call needs to be paid for when a terminal side adapter unit responds to a sequence of polling calls from the center side adapter unit by calling the center side adapter unit. The chances that aborted early morning calls from third parties might trigger a terminal side adapter unit to make an unnecessary call to the center are vanishingly small since the time zones themselves are relatively narrow in the illustrated embodiment and since a sequence of calls within the time zones is needed. Furthermore there is a minimum of interference with normal telephone usage. An outgoing voice call can be made whenever the line is not actively engaged during communication with the center, and since such communication is normally scheduled during early morning hours any conflict should be rare. Moreover normal incoming calls can be received even in the early morning hours unless the line is already busy with voice or data communication. Furthermore, if an outgoing voice call is made during communication with the center, the terminal side adapter unit can interrupt that communication and give priority to the call.

Although the invention has been described in its preferred form with a certain degree of particularly, it is to be understood that many variations and changes are possible in the invention without departing from the scope thereof.

What we claim is:

1. A communication system, comprising:
    a telephone network for switching a plurality of telephone lines;
    a telephone accessible to the telephone network;
    a non-telephone terminal for performing data communication via the telephone network;
    first control means, connected to a first telephone line of the plurality of telephone lines, for controlling the connection of the telephone and the non-telephone terminal to the telephone network, the first control means including timer means for monitoring predetermined time zones and for measuring first and second predetermined time periods;
    center apparatus means for supervising data communication with the non-telephone terminal; and
    second control means, connected to a second telephone line of the plurality of telephone lines, for controlling the connection of the center apparatus means to the telephone network, the second control means including means for initiating a predetermined sequence of calls to the first control means via the telephone network in response to the center apparatus means, and means for interrupting each call after receiving a respective ring back signal from the telephone network to restore the lines,
    wherein the first control means additionally includes means for determining whether a ringing signal for a call is received within a time zone and interrupted within the first time period, means for determining whether a call is received in the predetermined sequence, and means for calling the second control means if the first control means receives a plurality of calls in the predetermined sequence and each of the plurality of calls in the predetermined sequence was received during a respective time zone and interrupted within the first time period, and
    wherein the first control means additionally includes means for connecting the first telephone line to the non-telephone terminal if the first control means receives an answer signal from the second control means in response to the call from the first control means within the second time period.

2. A system in accordance with claim 1, wherein the non-telephone terminal comprises means for reading a gas meter and for transmitting data representative of an amount of gas used.

3. A system in accordance with claim 1, wherein the first control means further comprises means for connecting the first telephone line to the telephone if the first control means receives a ringing signal the outside a time zone.

4. A system in accordance with claim 1, wherein the first control means further comprises means for connecting the first telephone line to the telephone if the first control means does not confirm the interruption of a ringing signal within the first time period.

5. A system in accordance with claim 1, wherein the sequence includes a plurality of calls, each of which is received by the first control means in a respective one of a plurality of time zones.

6. A system in accordance with claim 1, wherein the first control means further comprises means for correcting the timer means in accordance with directions sent from the center apparatus means.

7. A system in accordance with claim 6, wherein the means for correcting the timer means comprises at least one of means for correcting the current time, means for changing the time zones, means for changing the first time period, and means for changing the second time period.

8. A system in accordance with claim 1, wherein the first control means further comprises means for changing the sequence in accordance with instructions sent from the center apparatus means.

9. A system in accordance with claim 1, wherein the timer means comprises a first timer for monitoring the time zones and a second timer for monitoring the first and second time periods.

10. An adapter unit connected to a telephone network, a telephone, and non-telephone terminal for performing data communication with a center apparatus, comprising:

means for receiving a ringing signal for a call sent via the telephone network;

means for determining whether the ringing signal was received within one of a plurality of predetermined time zones;

means for determining whether the ringing signal was interrupted within a predetermined first time period;

means for determining whether the call was received in a predetermined sequence;

means for calling the center apparatus if the ringing signal was received within a time zone, the ringing signal was interrupted within the first time period, and the call was the last call received in the sequence; and means for connecting the telephone network to the non-telephone terminal if the adapter unit receives an answer signal from the center apparatus in response to the call to the center apparatus within a predetermined second time period.

11. An adapter unit in accordance with claim 10, wherein the adapter unit further comprises means for connecting the telephone network to the telephone if the adapter unit receives a ringing signal outside a time zone.

12. An adapter unit in accordance with claim 10, wherein the adapter unit further comprises means for connecting the telephone network to the telephone if a ringing signal is not interrupted within the first time period.

13. A method for connecting a non-telephone terminal to a telephone network to permit data communication with a center apparatus or for connecting a telephone to the network, using an adapter unit which is connected to both the non-telephone terminal and the telephone, comprising the steps of:

receiving a ringing signal for a call sent via the telephone network;

determining whether the ringing signal was received within one of a plurality of time zones;

determining whether the ringing signal was interrupted within a predetermined first time period;

determining whether the call was received in a predetermined sequence;

calling the center apparatus if the ringing signal was received within a time zone, the ringing signal was interrupted within the first time period, and the call was the last call received in the sequence; and connecting the telephone network to the non-telephone terminal if the adapter unit receives an answer signal from the center apparatus in response in response to the call to the center apparatus within a predetermined second time period.

14. A method according to claim 13, further comprising the step of connecting the telephone to the network if the adapter unit receives a ringing signal outside of a time zone.

15. A method according to claim 13, further comprising the step of connecting the telephone to the network if the adapter unit receives a ringing signal which is not interrupted with the first time period.

16. A method for connecting a non-telephone terminal to a telephone network to permit data communication with a data center apparatus or for connecting a telephone to the network, using an adapter unit which is connected to both the non-telephone terminal and the telephone, comprising the steps of:

receiving at the adapter unit a first ringing signal for a call sent via the network;

connecting the telephone to the network if the first ringing signal was not received during a first predetermined time zone;

connecting the telephone to the network if the first ringing signal was received during the first time zone but was not interrupted within a predetermined time period;

receiving at the adapter unit a second ringing signal for another call sent via the network;

connecting the telephone to the network if the second ringing signal was not received within a second predetermined time zone;

connecting the telephone to the network if the second ringing signal was received during the second time zone but was not interrupted within the predetermined time period; and telephoning the data center apparatus if the first ringing signal was received during the first time zone, the second ringing signal was received during the second time zone, and both ringing signal were interrupted within the predetermined time period.

17. A method in accordance with claim 16, further comprising the steps of receiving at the adapter unit a signal from the data center apparatus after the step of telephoning the data center has been conducted, returning an answer signal to the data center apparatus if the signal from the data center apparatus was received during another predetermined time zone, and connecting the non-telephone terminal to the telephone network.

18. A method in accordance with claim 17, further comprising the step of discontinuing the call to the data center apparatus if the signal from the data center is not received during the another time zone.

19. A method in accordance with claim 16, further comprising the steps of transmitting at least one signal over the telephone network between the data center apparatus and the adapter unit after the step of telephoning the data center apparatus has been conducted, and connecting the non-telephone terminal to the telephone network after the at least one signal has been transmitted.

20. A method in accordance with claim 16, wherein the first time zone has a duration of less than about fifteen minutes, the second time zone has a duration of less than about fifteen minutes, and the first time zone ends at least five minutes before the second time zone begins.

21. A method in accordance with claim 16, wherein the first and second time zones have a common duration, and are separated in time by an amount greater than the common duration.

* * * * *